United States Patent [19]

Godfrey

[11] 4,146,521

[45] Mar. 27, 1979

[54] POLYETHYLENE CONTAINING HOT MELT ADHESIVES

[75] Inventor: Darryl A. Godfrey, Longview, Tex.

[73] Assignee: Eastman Kodak Company, Rochester, N.Y.

[21] Appl. No.: 830,297

[22] Filed: Sep. 2, 1977

[51] Int. Cl.$^2$ .................. C08L 23/08; C09J 3/14
[52] U.S. Cl. .................. 260/27 R; 156/334; 260/27 BB; 260/28.5 R; 260/28.5 AV; 260/878 R; 260/885; 260/897 B; 428/461
[58] Field of Search .......... 260/28.5 R, 27 R, 27 BB, 260/878 R, 885, 897 B, 28.5 AV; 156/334; 428/461

[56] References Cited

U.S. PATENT DOCUMENTS

| | | | |
|---|---|---|---|
| 3,239,478 | 3/1966 | Harlan | 260/876 B |
| 3,541,188 | 11/1970 | Srail | 156/334 |
| 3,616,044 | 10/1971 | Kehr | 156/334 |
| 3,645,949 | 2/1972 | Crimi | 260/28.5 AV |
| 3,663,663 | 5/1972 | McAd a | 260/28.5 AV |
| 3,701,760 | 10/1972 | Hagemeyer et al. | 526/25 |
| 3,770,572 | 11/1973 | Henry et al. | 428/462 |
| 3,856,889 | 12/1974 | McConnell | 260/876 R |
| 3,860,543 | 1/1975 | Masuda et al. | 260/897 B |
| 3,926,878 | 12/1975 | Shimizu et al. | 260/897 B |
| 4,012,547 | 3/1977 | Smedberg | 260/897 B |

*Primary Examiner*—Ronald W. Griffin
*Attorney, Agent, or Firm*—Clyde L. Tootle; Daniel B. Reece, III

[57] ABSTRACT

The hot melt adhesives of the present invention comprise a blend of at least one polyethylene resin, an ethylene/lower alkyl acrylate copolymer, a tackifying resin, and a high density, low viscosity, polyethylene wax having a molecular weight of about 1000. This hot melt adhesive has a novel combination of properties including excellent elevated temperature properties, and provides excellent adhesion to nonporous substrates such as aluminum foil.

8 Claims, No Drawings

POLYETHYLENE CONTAINING HOT MELT ADHESIVES

This invention relates to polyethylene containing hot melt adhesives. One aspect of this invention concerns a polyethylene containing hot melt adhesive having a novel combination of properties. Another aspect of this invention concerns a polyethylene containing hot melt adhesive that has good adhesive properties for bonding nonporous substrates as well as excellent elevated temperature properties.

Hot melt adhesives are widely used in industry for various applications such as in product assembly. For example, one such application is in the bonding of nonporous substrates, such as foil-to-foil and paper-to-foil. Previously, to obtain satisfactory bonding for nonporous substrates it was necessary to use an ethylene vinyl acetate based hot melt adhesive. However, ethylene vinyl acetate based adhesives have poor elevated temperature properties. The ethylene vinyl acetate based adhesives have the disadvantage that at elevated temperature they decompose easily. Moreover, it was not possible to modify the ethylene vinyl acetate based adhesives with polyolefins to improve the elevated temperature properties as the blends were incompatible. Therefore, it would be an advance in the state of the art to provide a polyethylene based hot melt adhesive useful for bonding nonporous substrates and having excellent elevated temperature properties.

It is, therefore, an object of the present invention to provide a novel hot melt adhesive.

Another object of this invention is to provide a hot melt adhesive that is capable of bonding nonporous substrates.

A further object of the present invention is to provide a polyethylene containing hot melt adhesive which can be used in rapid bonding of nonporous substrates and has excellent elevated temperature properties.

Another and further object of this invention is to provide an adhesive having good adhesion properties which can be applied without the use of a solvent.

In accordance with the present invention I have found that a blend comprising at least one polyethylene resin, an ethylene/lower alkyl acrylate copolymer, a tackifying resin, and a high density, low viscosity polyethylene wax having a molecular weight of about 1000, provides a hot melt adhesive which can be applied without solvents and has a novel combination of properties including excellent bonding to nonporous substrates, good bond aging properties and excellent elevated temperature properties.

The polyethylene can be any of the normally solid polyethylenes having a melt index of 100 to 5,000 at 190° C., preferably 2000 to 2500, and a density greater than 0.90 to about 0.93 g./cc. The polyethylenes are prepared by processes well known in the art. For example, polyethylenes with such densities are prepared by polymerizing ethylene at pressures greater than 500 atmospheres in the presence of peroxide catalysts. Blends of such polyethylenes prepared by the same or different processes can also be used.

The polyethylene can also be a modified polyethylene having a saponification number of about 3 to 60 prepared by reacting polyethylene with an unsaturated polycarboxylic acid, anhydride or ester thereof by processes also well known in the art, as for example, U.S. Pat. No. 3,856,889. The polyethylene reacted with this unsaturated component can be low molecular weight or degraded polyethylene. The modified polyethylene can be used alone as the polyethylene component or blends of such modified polyethylene with unmodified polyethylene or blends of modified polyethylene and blends of more than one unmodified polyethylene can also be used.

The ethylene/lower alkyl acrylate copolymer suitable in this invention is, for example, an ethylene/ethyl acrylate copolymer having a melt index of 2 to 30, preferably 6 to 20, a density of 0.915 to 0.95 and an ethyl acrylate content of 10 to 25 percent, preferably 18 percent to 23 percent by weight. A typical material may be purchased under the trade name of Bakelite, marketed by the Union Carbide Company. Such useful ethylene/ethyl acrylate copolymers include materials prepared by the copolymerization of ethylene and ethyl acrylate at pressures of approximately 15,000 psi., and temperatures between 150° and 250° C. in the presence of a suitable catalyst. Other suitable ethylene/lower alkyl acrylates are ethylene/butyl acrylates and the like.

The tackifying resins useful in the adhesive compositions of this invention can be a hydrocarbon resin such as DAC-B hydrocarbon resin prepared according to the process disclosed in U.S. Pat. No. 3,701,760 as well as other hydrocarbon resins, synthetic polyterpenes, rosin esters and the like. One such suitable hydrocarbon tackifying resin is a hydrocarbon resin having a softening point of 130° C. and available commerically as Eastman Resin H-130 from Eastman Chemical Products, Inc. Other hydrocarbon tackifying resins can be prepared by the polymerization of monomers consisting primarily of olefins and diolefins and include, for example, the residual by-product monomers resulting from the manufacture of isoprene. These hydrocarbon tackifying resins typically exhibit a ring and ball softening point of from about 75 to 150° C.; an acid number of from about 0 to 2; a saponfication value of less than about 1; and an iodine value of from about 75–100. Examples of such commercially available resins of this type are "Wingtack 95" as sold by the Goodyear Tire and Rubber Co. and the Sta-Tac and Betaprene H resins sold by the Reichhold Chemical Corp.

Also suitable resins are the rosin ester resins and the terpene polymers such as the polymeric, resinous materials including the dimers as well as higher polymers obtained by polymerization and/or copolymerization of terpene hydrocarbons such as the alicyclic, monocyclic, and bicyclic monoterpenes and their mixtures, including allo-ocimene, carene, isomerized pinene, pinene, dipentene, terpinene, terpinolene, limonene, terpentine, a terpene cut or fraction, and various other terpenes. Particularly useful starting materials are terpene mixtures containing at least 20% β-pinene and/or limonene or dipentene (racemic limonene), and the "sulfate turpentine" obtained as a by-product in the sulfate pulping process.

The high density, low viscosity polyethylene waxes useful in this invention are widely available articles of commerce and can be prepared by known techniques. These waxes are made by direct polymerization of ethylene to a high density polyethylene wax having a melting point of 85°–130° C. and melt viscosity of from 2 to 300 cp. at 150° C. The high density polyethylene wax preferably has a molecular weight of about 800 to 2500, most preferably about 1000, a penetration hardness at 23° C. of about 1.0, and a melt viscosity preferably of about 25 cp. at 150° C. Such waxes are sold under various trade names such as the Bareco 1000 polywax, sold by Petrolite Corporation. These high density, low viscosity polyethylene waxes provide adhesive compositions which have superior high temperature bond strengths from that provided by adhesive blends without the high density waxes, or with blends which contain other commercially available aliphatic hydrocarbon waxes.

The polyethylene wax can be used in amounts of about 7 to 15 percent by weight of the adhesive composition, preferably about 10 to 12 percent by weight. The hydrocarbon resins and polyterpene tackifying resins can be used either alone or in combination. These tackifying resins can be used in amounts of about 13 percent to about 40 percent by weight of the adhesive composition, preferably about 25 to 30 percent by weight. The polyethylene or a blend of such polyethylenes can be used in amounts of 30 to 40 percent by weight in the adhesive formulation, preferably 32 to 35 percent by weight. The ethylene/lower alkyl acrylate copolymer can be used in an amount of 20 to 40 percent by weight, preferably 26 to 32 percent by weight. The adhesives of the present invention have a particular combination of properties including good bond strength to nonporous substrates, good elevated temperature properties, good bond integrity and flexibility. The components of the adhesive within the above ranges provide an adhesive which has the desired properties. If the amounts of the components are modified from these ranges, the desirable combination of properties of the adhesive are affected. For example, if the high density polyethylene wax is used in an amount greater than about 15 percent, the adhesive becomes brittle and doesn't have the desirable flex properties. If the wax is present in an amount less than about 7 percent the adhesive doesn't have the desirable elevated temperature properties. If the base polyethylene is used in an amount greater than 40 percent, the adhesion properties of the adhesive to a nonporous substrate are lowered. Likewise, if less than 13 percent tackifier is used the adhesion properties of the adhesive are lowered. If less than 20 percent ethylene/ethyl acrylate is used the integrity of the bond strength is decreased. More than 40 percent ethylene/ethyl acrylate adversely affects the elevated temperature properties.

The adhesive compositions of this invention are prepared by blending together the adhesive components in the melt at a temperature of about 160° C. to about 200° C. until a homogeneous mixture is obtained. Various methods of blending materials of this type are known to the art and any method that produces homogeneous mixture is satisfactory. These components blend easily in the melt and a heated vessel equipped with a stirrer is all that is required. For example, a Cowles stirrer provides effective mixing for preparing these compositions. Solvents such as hexane, heptane, mineral spirits, xylene, toluene, benzene, chlorinated hydrocarbons, etc., are not needed to prepare the compositions of this invention; however, they can be used if desired.

In addition to the adhesive components, it is desirable for the adhesive compositions to contain about 0.1 percent to about 1.5 percent by weight, preferably about 0.25 percent to 1.0 percent by weight, of one or more antioxidants. Antioxidants that are effective include, for example, tris(di-t-butyl-p-hydroxybenzyl)-trimethyl-benzene (Ionox 330), alkylated bisphenol (Naugawhite), zinc dibutyl dithiocarbamate (Butyl Zimate), and 4,4'-methylene bis(2,6-di-tert-butylphenol) (Ethyl 702), tetrakis[methylene-3-(3',5'-di-t-butyl-4-hydroxyphenyl)-propionate]-methane (Irganox 1010), lauryl stearyl thiodipropionate (Plastanox 1212), and dilauryl 3,3'-thiodipropionate (Plastanox DLTDP sold by American Cyanamid) and 2,6-di-tert-butyl-p-cresol (BHT) and the like.

Additives such as nucleating agents, pigments, colorants, fillers, solvents, and the like can also be added to the adhesive compositions of the present invention.

The adhesive compositions of this invention, which are essentially 100 percent solids, have a melt viscosity in the range of 5,000 to 30,000 centipoise at 375° F., preferably 10,000 to 15,000 centipoise, most preferably 12,000 centipoise.

This invention can be further illustrated by the following examples of preferred embodiments thereof, although it will be understood that these examples are included merely for purposes of illustration and are not intended to limit the scope of the invention unless otherwise specifically indicated.

EXAMPLE 1

Low-molecular weight polyethylene (104 g.) having a melt viscosity of 3075 cp. at 177° C., density of 0.906 g./cc., and ring and ball softening point of 105° C.; 75 grams ethylene/ethyl acrylate copolymer containing 23 weight percent ethyl acrylate and a melt index of 20; 70 grams of Eastman Resin H-130 hydrocarbon resin tackifier having a density of 1.028 g./cc. at 70° F., melt viscosity of about 1000 cp. at 190° C., and ring and ball softening point of 129° C.; 30 grams of Bareco 1000 polywax having a melting point of 113°–117° C. and a melt viscosity of 4.2 cp. at 177° C.; and 0.6 gram of tetrakis[methylene-3-(3',5'-di-t-butyl-4-hydroxyphenyl)propionate]methane are placed in a 500 ml. round bottom resin pot fitted with a mechanical stirrer and nitrogen purge line. The system is purged with nitrogen and heated to 200° C. using a metal bath. The polymer blend is stirred for one hour after melting to insure that the blend is homogenous. The molten adhesive is applied as a thin film to aluminum foil and bonded to another aluminum foil by applying pressure and heat to the foils. This adhesive bonded the aluminum foils which on cooling formed an excellent bond between the foils.

EXAMPLE 2

Low-molecular weight polyethylene (180 g.) having a melt viscosity of 3075 cp. at 177° C., density of 0.906 g./cc. and ring and ball softening point of 105° C.; 70 grams of Eastman Resin H-130 hydrocarbon resin tackifier having a density of 1.028 g./cc. at 70° F., melt viscosity of about 1000 cp. at 190° C. and ring and ball softening point of 129° C.; 30 grams of Bareco 1000 polywax having a melting point of 113°–117° C. and a melt viscosity of less than 5 cp. at 150° C.; and 0.6 gram of tetrakis[methylene-3-(3',5'-di-t-butyl-4-hydroxyphenyl)propionate]methane are placed in a 500 ml. round bottom resin pot fitted with a mechanical stirrer and nitrogen purge line. The system is purged with nitrogen and heated to 200° C. using a metal bath. The polymer blend is stirred for one hour after melting to insure that the blend is homogeneous. The molten adhesive is applied as a thin film to aluminum foil and pressed to another aluminum foil by applying pressure and heat to the foils. The aluminum foils on cooling did not form a satisfactory bond between the foils and separated easily.

EXAMPLE 3

Low-molecular weight polyethylene (104 g.) having a melt viscosity of 3075 cp. at 177° C., density of 0.906 g./cc., and ring and ball softening point of 105° C.; 75 grams ethylene/ethyl acrylate copolymer containing 23 weight percent ethyl acrylate and a melt index 20; 70 grams of Eastman Resin H-130 hydrocarbon resin tackifier having a density of 1.028 g./cc. at 70° F., melt viscosity of about 1000 cp. at 190° C., and ring and ball softening point of 129° C.; 30 grams of paraffin wax having a melting point of 65° C. and a melt viscosity of 2 cp. at 177° C.; and 0.6 gram of tetrakis[methylene-3-(3′,5′-di-t-butyl-4-hydroxyphenyl)propionate]methane are placed in a 500 ml. round bottom resin pot fitted with a mechanical stirrer and nitrogen purge line. The system is purged with nitrogen and heated to 200° C. using a metal bath. The polymer blend is stirred for one hour after melting to insure that the blend is homogeneous. The molten adhesive is applied as a thin film to aluminum foil and pressed to another aluminum foil by applying pressure and heat to the foils. The aluminum foils on cooling did form a satisfactory bond between the foils but the bond had poor elevated temperature properties.

The hot melt adhesives comprising a blend of at least one polyethylene resin, an ethylene/ethyl acrylate copolymer, a tackifying resin, and a high density, low viscosity polyethylene wax provide adhesives having a unique combination of properties for bonding nonporous substrates and having excellent elevated temperature properties. These adhesives provide excellent bond strengths when applied over a broad range of substrates as, for instance, paper, cellophane, aluminum foil, cellulose acetate, and the like, as well as laminating any combination of such substrates.

The invention has been described in detail with particular reference to certain preferred embodiments thereof, but it will be understood that variations and modifications can be effected within the spirit and scope of the invention.

I claim:

1. An adhesive composition capable of being used as a hot melt adhesive comprising a blend of
    (a) about 30 to 40 percent by weight of at least one normally solid polyethylene resin,
    (b) about 20 to 40 percent by weight of at least one ethylene-lower alkyl acrylate copolymer,
    (c) about 13 to 40 percent by weight of at least one tackifier resin selected from the group consisting of hydrocarbon resin, polyterpene resin and rosin ester resin, and
    (d) about 7 to 15 percent by weight of a high density, low viscosity polyethylene wax.

2. An adhesive composition according to claim 1 wherein said high density, low viscosity polyethylene wax has a melting point within the range of 85° C. to 130° C. and a molecular weight of about 1000.

3. An adhesive composition according to claim 2 wherein said polyethylene has a melt viscosity of from about 750 to about 100,000 centipoise at 177° C.

4. An adhesive composition according to claim 3 wherein said hydrocarbon tackifier resin is DAC-B hydrocarbon resin.

5. An adhesive composition capable of being used as a hot melt adhesive comprising a blend of
    (a) about 32 to 35 weight percent of at least one polyethylene,
    (b) about 26 to 32 weight percent of at least one ethylene-ethyl acrylate copolymer,
    (c) about 25 to 30 weight percent of at least one tackifier selected from the group consisting of hydrocarbon resin, polyterpene resin, or rosin ester resin, and
    (d) about 10 to 12 weight percent of a high density polyethylene wax.

6. An adhesive composition according to claim 5 wherein said high density polyethylene wax has a melting point within the range of 85° C. to 130° C.

7. An adhesive composition according to claim 6 wherein said polyethylene has a melt viscosity of from about 750 to about 100,000 centipoise at 177° C.

8. An adhesive composition according to claim 7 wherein said hydrocarbon tackifier resin is DAC-B hydrocarbon resin.

* * * * *